(12) United States Patent
Drabarek

(10) Patent No.: US 8,830,482 B2
(45) Date of Patent: Sep. 9, 2014

(54) INTERFEROMETRIC PATH AND/OR ROTATION MEASURING DEVICE

(75) Inventor: Pawel Drabarek, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 13/379,483

(22) PCT Filed: Jun. 18, 2010

(86) PCT No.: PCT/EP2010/058597
§ 371 (c)(1),
(2), (4) Date: Mar. 13, 2012

(87) PCT Pub. No.: WO2011/000715
PCT Pub. Date: Jan. 6, 2011

(65) Prior Publication Data
US 2012/0162658 A1    Jun. 28, 2012

(30) Foreign Application Priority Data
Jun. 29, 2009    (DE) .......................... 10 2009 027 266

(51) Int. Cl.
*G01B 11/02*    (2006.01)
*G01D 5/347*    (2006.01)
*G01B 9/02*    (2006.01)
*G01D 5/38*    (2006.01)

(52) U.S. Cl.
CPC ........ *G01D 5/34723* (2013.01); *G01B 9/02065* (2013.01); *G01D 5/38* (2013.01)
USPC .......................................................... 356/499

(58) Field of Classification Search
CPC ... G01D 5/34723; G01D 5/38; G01B 9/02065
USPC ......... 356/455, 479, 482, 484, 486, 488, 493, 356/494, 497, 498, 499, 521; 250/231.18, 250/231.15, 231.17
See application file for complete search history.

(56) References Cited

U.S. PATENT DOCUMENTS

| | | | | |
|---|---|---|---|---|
| 3,822,942 A | * | 7/1974 | Hock | 356/492 |
| 4,551,017 A | * | 11/1985 | Mannava et al. | 356/28.5 |
| 4,627,731 A | * | 12/1986 | Waters et al. | 356/479 |
| 7,187,450 B2 | * | 3/2007 | Drabarek | 356/497 |

FOREIGN PATENT DOCUMENTS

| | | |
|---|---|---|
| DE | 38 21 046 | 12/1989 |
| DE | 39 30 554 | 3/1991 |
| DE | 196 50 703 | 6/1998 |
| DE | 197 07 109 | 6/1998 |
| DE | 10 2006 014766 | 10/2007 |
| EP | 0 420 897 | 4/1991 |
| EP | 1 669 725 | 6/2006 |

OTHER PUBLICATIONS

International Search Report for PCT/EP2010/058597, dated Sep. 24, 2010.

* cited by examiner

*Primary Examiner* — Michael A Lyons
*Assistant Examiner* — Willie Merrell, II
(74) *Attorney, Agent, or Firm* — Kenyon & Kenyon LLP

(57) ABSTRACT

An interferometric path and/or rotation measuring device has a transducer unit with grating element, which transducer cooperates with a light conductor unit and a light pickup unit to detect a linear and/or rotational movement of the grating element in such a way that two partial beams of the light conductor unit which are aimed at the grating element, generate a superposition signal which is detectable by the light pickup unit and is a function of the linear or rotational movement and/or a position of the grating element. A modulation interferometer unit is connected upstream from the light conductor unit and has an arrangement for beam splitting into the two partial beams.

10 Claims, 2 Drawing Sheets

INTERFEROMETRIC PATH AND/OR ROTATION MEASURING DEVICE

BACKGROUND INFORMATION

The present invention relates to an interferometric path and/or rotation measuring device, the term "rotation measuring device" also being understood as "angle measuring." The principle of such a device is known from EP 0 420 897 B1. Accordingly, path information is obtained via the Doppler Effect and two optical partial beams, which are generated with the aid of a modulation interferometer unit, are directed onto an interferometric grating (grating means) and generate interference which is recorded by an interferometric light pickup, e.g., a photodiode, at a shared point of incidence.

If the grating means move in a linear or rotational movement, the light pickup unit may detect this as a phase change of the output signal (superposition signal) and subsequently convert it into desired path or rotational path (angle) information.

Path and rotation measuring devices which operate according to this principle are generally known and commercially available and are used, for example, in the field of industrial and manufacturing measuring technology.

However, the related art which is presumed to form the species has the disadvantage that the known device (which is typically integrated into a housing), when suitably attached to a measuring or production system, is sensitive to ambient influences such as temperature, vibration, etc., so that either complex measures are necessary to decouple such a housing, or the measuring precision and the field of use of these technologies is limited by the ambient conditions.

SUMMARY OF THE INVENTION

The object of the present invention is therefore to improve an interferometric path and/or rotation measuring device with respect to its universal usability, in particular its sensitivity in relation to ambient and environmental influences.

The object is achieved by the device having the features of the main claim; advantageous refinements of the present invention are described in the subclaims.

In an advantageous way according to the present invention, the suitable stationary and protected modulation interferometer unit, which may be provided, for a (preferably elongated and/or flexible) light conductor which causes effective decoupling, is connected to a transducer unit which may be provided at a concrete usage or measuring location in such a way that disadvantageous vibration or temperature influences act on the transducer unit, but leave the modulation interferometer unit unimpaired. For this purpose, it is advantageously provided according to the present invention that the two partial beams (delayed longer than the optical coherence length by the optical delay route) are guided jointly coupled in through the light conductor to the transducer unit, without a measurable mutual influence occurring.

The interferometric cooperation with the grating means and the recording of the optical superposition signal by the light pickup unit occur at the transducer unit, which is separate and only coupled on by the light conductor according to the present invention, the light pickup unit being connected in an otherwise known way to downstream analysis and computer means.

In an advantageous way according to the present invention, the system made of interferometric light conductor unit, interferometric grating means, and interferometric pickup unit is implemented as a so-called in-plane unit according to the principle of the grating interferometer; both partial beams are diffracted at the grating means and are merged to generate the superposition signal, the phase change thereof being analyzable in an otherwise known way to generate the desired path and/or angle information.

In a favorable way according to the present invention, the functional units are situated relative to one another in such a way that a grating plane described by the grating means extends between a light exit of the light conductor unit and the light pickup unit.

In an advantageous way according to the present invention, according to preferred refinements of the present invention, the function of the modulation interferometer unit for heterodyne interferometry is made possible. For this purpose, a modulator (preferably implemented as an acoustic-optical modulator) is provided as a functionality of the modulation interferometer unit in such a way that a frequency shift is made possible between the two light beams.

To be able to bring the two partial beams into interference at the transducer after their diffraction at the grating means, second optical delay means are provided according to the present invention, via which the optical delay by the delay route at the end of the light conductor may be compensated for again, in such a way that the optical path difference caused by the second optical delay means thus corresponds to the optical path difference of the first delay means in the modulation interferometer unit. For example, such a delay route is suitably implemented by a (displaceable) prism.

While, on the one hand, it is preferable and included by the present invention to perform an interferometric path measurement on the basis of a grating which is linearly movable corresponding to the path to be measured, it is equally preferable and included by the present invention to perform an interferometric rotational measurement (angle measurement), in which a grating (e.g., star-shaped or designed as radially symmetric in another way) rotates around a predetermined rotational axis and such an angle offset caused by the rotation results as an interference pattern (more precisely: an interferometrically measured light phase difference) detected by the light pickup unit according to the present invention.

To increase the angle resolution and according to a further preferred specific embodiment of the present invention as a rotation measuring device, it is preferable to double the two partial beams (as a beam pair) through suitable additional beam splitting after the light conductor exit and to provide them at two positions of the rotationally movable grating pattern, e.g., on both sides of the rotational axis (using a suitable interferometric light pickup unit in each case). In this way the light phase of both channels thus produced are each shifted in opposing directions during rotation of the grating means.

As a result, the present invention allows, in a simple and elegant way, grating interferometry to also be used in usage conditions which are strongly stressed by temperature or vibration. The use of the present invention suggests itself for manifold fields of application, the suitability for industrial measuring tasks being particularly obvious, but the breadth of application of the present invention not being restricted thereto.

Further advantages, features, and details of the present invention result from the following description of preferred exemplary embodiments and on the basis of the drawings.

Figure 1:
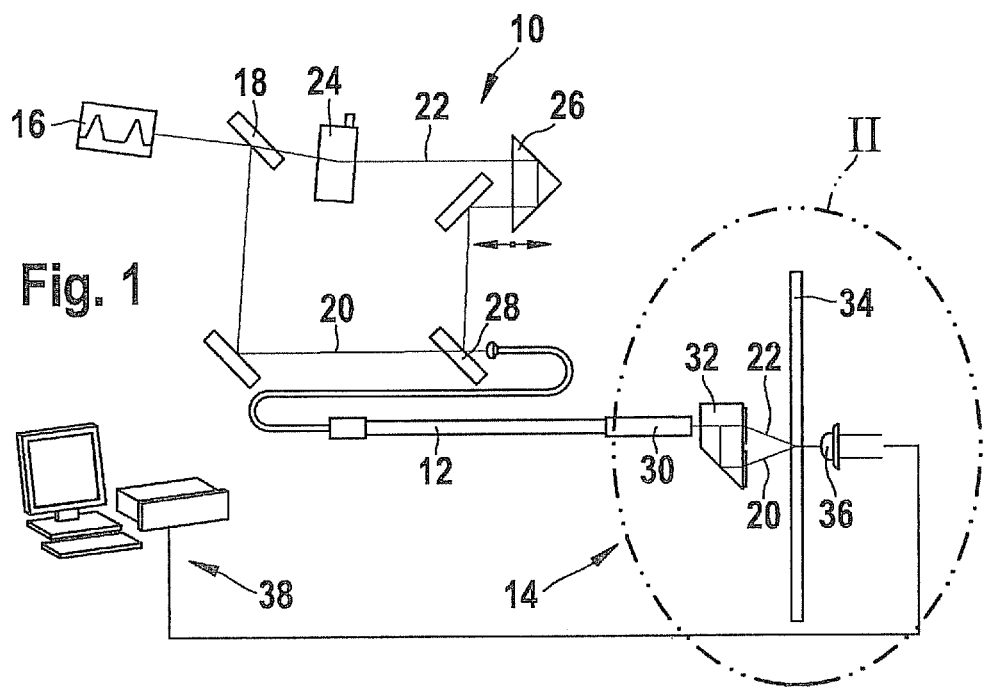
FIG. 1 shows a schematic circuit diagram of an interferometric path measuring device according to a first exemplary embodiment of the present invention.

FIG. 1 illustrates the implementation of the interferometric path measuring device as a combination of a stationary modulation interferometer unit 10, which is provided in particular to be protected from temperature and/or vibration, and which is connected via a monomodal light conductor 12 to a transducer unit 14 attached at a usage or measuring location.

Modulation interferometer unit 10, as the first subsystem of the entire device, has a heterodyne interferometer of the Mach-Zehnder type, having a short-coherence light source 16, implemented as a superluminescent diode, for example (wavelength approximately 800 nm), downstream from which a beam splitter 18 is connected to generate a measuring beam 20 and a reference beam 22. Reference beam 22 passes through an acoustic-optical modulator 24 in an otherwise known way, which causes a frequency shift of the reference beam relative to the measuring beam (e.g., frequency difference 100 kHz). In addition, a delay unit (delay route) 26 is provided in the reference branch in the form of a displaceable prism, which causes a difference of the optical paths of reference beams and measuring beam, which is greater than the coherence length of the employed light, in particular is a multiple of this coherence length. In the described exemplary embodiment, in the case of an assumed coherence length of short-coherence light source 16 of approximately 100 µm, the delay route caused by delay unit 26 is 1 mm, i.e., 10 times the coherence length, and is therefore large in relation to the coherence length.

This causes the reference beam, which is subsequently merged with the measuring beam at mirror unit 28, to be able to be coupled jointly into individual (single) light conductor 12 and guided therein, without interference of these partial beams occurring.

In the second subsystem (i.e., transducer unit 14), beam splitting occurs at the output of a collimator 30 provided at the end of the light conductor, a provided deflection prism 32 delaying one of partial beams 20, 22 similarly to prism unit 26, in other words, canceling out the relative delay existing at the light conductor input. Correspondingly, partial beams 20, 22 exiting from the prism may pass in an otherwise known way through a grating gauge 34 as grating means which are movable for the movement measurement, are diffracted in an otherwise known way at the grating, and interfere, so that a photodiode 36 opposite to prism 32 in relation to grating unit 34 may receive the superimposed signal and the desired light phase may be electronically converted as a phase of the photodiode signal into a path measuring signal in a downstream analysis unit 38; the light phase difference which is measured by interferometry therefore includes the desired information about the shift of grating gauge 34.

Figure 2:
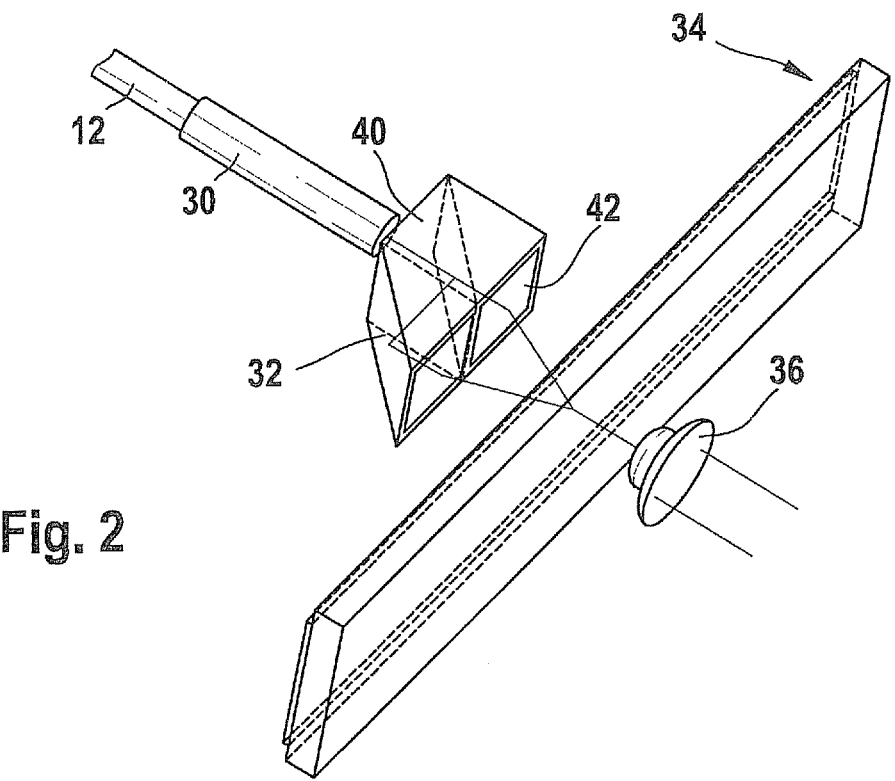
FIG. 2 shows a detail view of the measuring unit (transducer unit) of the device according to FIG. 1, as detail II from FIG. 1.

FIG. 2 illustrates the second subsystem in a detail view; it is clear how a beam splitter 40, which is seated at the output of light conductor 12, is provided as part of an assembly (shown as integrated here) on prism unit 32 to implement the transducer-side delay route. Deflection gratings 42 are also shown on each of the exit surfaces of the beam splitter/prism unit.

Figure 3:
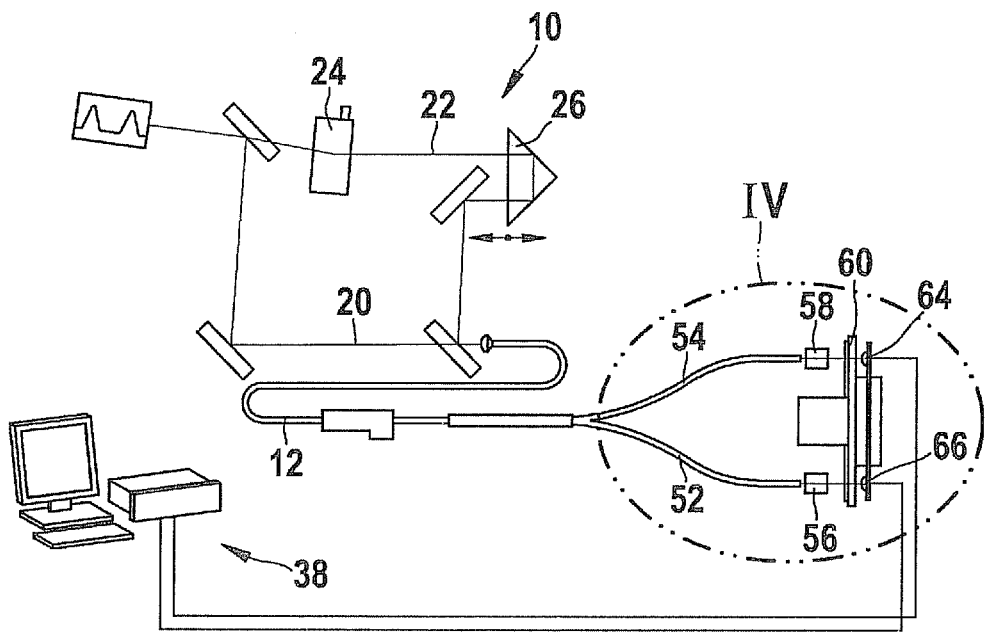
FIG. 3 shows a schematic circuit diagram of an interferometric rotation measuring device (angle measuring device) according to a second exemplary embodiment of the present invention.
Figure 4:
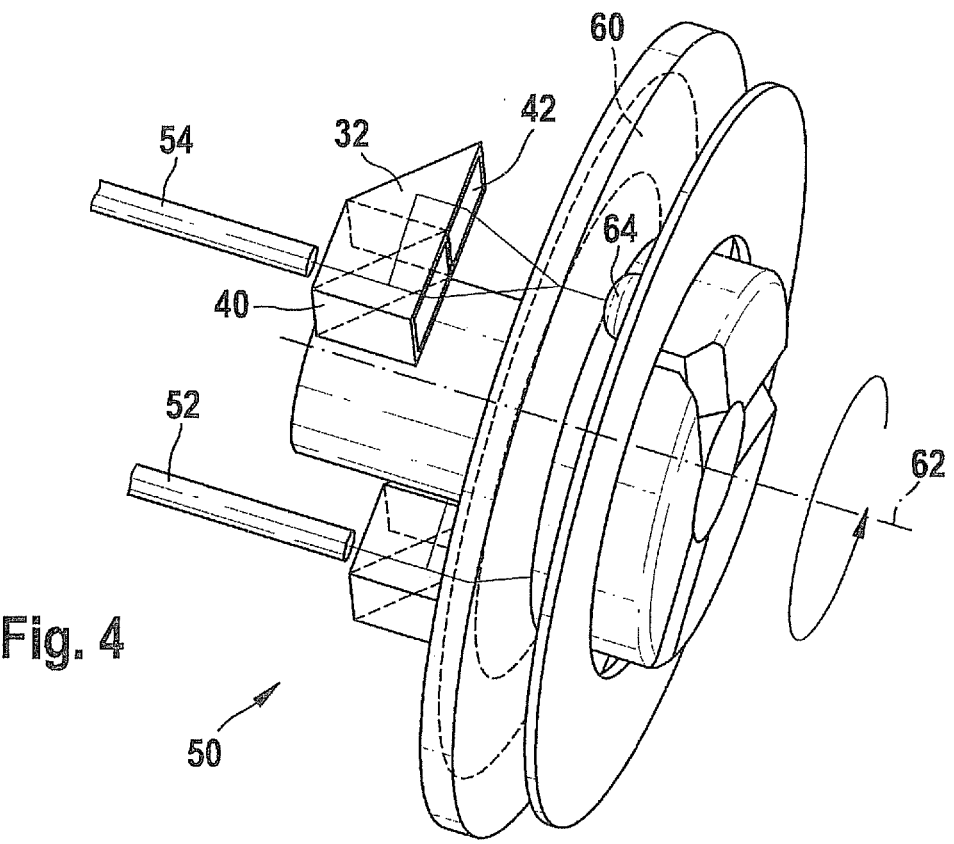
FIG. 4 shows a detail view of the measuring unit (transducer unit) of the exemplary embodiment of FIG. 3, as detail IV in FIG. 3.

FIGS. 3 and 4 illustrate the second exemplary embodiment of the present invention to implement an interferometric rotation measuring device. Modulation interferometer unit 10 as the first subsystem corresponds to unit 10 in FIG. 1.

At the end of light conductor 12 in the direction of a transducer unit 50, which is designed to record a rotational path (angle), (corresponding to the detail IV in FIG. 3), splitting into two beams guided in respective conductor branches 52, 54 occurs, which are then supplied to a beam splitter/prism arrangement 56 or 58 at the end of each branch. Similarly to unit 30, 42 described in connection with FIG. 2, the splitting of the beam exiting at the light conductor end and the delay corresponding to delay route of prism 26 of unit 10 occur, so that the decoupled partial beams may be brought into interference again in the above-described way, but twice for 52, 54.

The rotary encoder of unit 50 is a grating pattern 60 mounted so it is rotatable like a disk, which is designed to be linear (and originating from axis center point 62), and, similarly to the above-described linear procedure, allows the recording of the superimposed, interfering partial beams by a photodiode 64 or 66 assigned to each branch, respectively. Therefore, in contrast to the exemplary embodiment of FIG. 1, a signal pair results, which may be analyzed by analysis unit 38 to determine the rotational movement information. The device shown, which would also function in simplified form having only one branch (and accordingly one assigned photodiode), displays increased angle resolution in the way shown, since in the case of the rotation of rotating grating (rotating grating scale 60, the light phases of both branches (channels) are shifted in opposite directions.

What is claimed is:

1. A device for measuring at least one of an interferometric path and rotation, comprising:
 a fiber-optic light conductor unit;
 a transducer unit having a grating element and a light pickup unit; and
 a modulation interferometer unit positioned upstream from the light conductor unit, wherein the modulation interferometer unit includes a beam splitter for splitting a beam into two partial beams and a first delay element for providing optical delay of one of the two partial beams, the first delay element providing an optical delay route longer than an optical coherence length of the two partial beams;
 wherein the modulation interferometer unit is connected by the fiber-optic light conductor unit to the transducer unit, and wherein the two partial beams are jointly applied to the fiber-optic light conductor unit, the fiber-optic light conductor unit guiding the two partial beams to the grating element;
 wherein the two partial beams guided through the grating element produce a superposition signal which is a function of at least one of a linear movement of the grating element, a rotational movement of the grating element, and a position of the grating element, and wherein the light pickup unit detects the superposition signal to determine at least one of the linear movement and rotational movement of the grating element.

2. The device as recited in claim 1, wherein the fiber-optic light conductor unit is implemented in such a way that the two partial beams are diffracted on the grating element.

3. A device for measuring at least one of an interferometric path and rotation, comprising:
 a fiber-optic light conductor unit;
 a transducer unit having a grating element and a light pickup unit; and a modulation interferometer unit positioned upstream from the light conductor unit, wherein the modulation interferometer unit includes a beam splitter for splitting a beam into two partial beams and a first delay element for providing optical delay of one of the two partial beams, the first delay element providing an optical delay route longer than an optical coherence length of the two partial beams;

wherein the modulation interferometer unit is connected by the fiber-optic light conductor unit to the transducer unit, and wherein the two partial beams are jointly applied to the fiber-optic light conductor unit, the fiber-optic light conductor unit guiding the two partial beams to the grating element;

wherein the two partial beams guided to the grating element produce a superposition signal which is a function of at least one of a linear movement of the grating element, a rotational movement of the grating element, and a position of the grating element, and wherein the light pickup unit detects the superposition signal to determine at least one of the linear movement and rotational movement of the grating element;

wherein the light pickup unit is situated at a constant, fixed distance to the exit point of the two partial beams from the fiber-optic light conductor unit and in such a way that a grating plane defined by the grating element extends between the light exit and the light pickup unit.

4. The device as recited in claim 1, wherein the modulation interferometer unit is stationary and uninfluenced by a movement of the transducer unit.

5. The device as recited in claim 1, wherein the modulation interferometer unit includes a modulator configured to provide a frequency shift of the two partial beams in relation to one another.

6. The device as recited in claim 1, wherein the fiber-optic light conductor is configured as a single-mode optical fiber and is configured in such a way that the two partial beams are coupled in a state superimposed on one another and time-delayed relative to one another.

7. The device as recited in claim 1, wherein the transducer unit includes a second delay element for optical delay, the second delay element being configured to compensate for the optical delay provided by the first optical delay element.

8. The device as recited in claim 1, wherein the optical delay route is at least twice the optical coherence length.

9. The device as recited in claim 7, wherein the first and second delay elements each have a prism unit.

10. A device for measuring at least one of an interferometric path and rotation, comprising:
a fiber-optic light conductor unit;
a transducer unit having a grating element and a light pickup unit; and
a modulation interferometer unit positioned upstream from the light conductor unit, wherein the modulation interferometer unit includes a beam splitter for splitting a beam into two partial beams and a first delay element for providing optical delay of one of the two partial beams, the first delay element providing an optical delay route longer than an optical coherence length of the two partial beams;

wherein the modulation interferometer unit is connected by the fiber-optic light conductor unit to the transducer unit, and wherein the two partial beams are jointly applied to the fiber-optic light conductor unit, the fiber-optic light conductor unit guiding the two partial beams to the grating element;

wherein the two partial beams guided to the grating element produce a superposition signal which is a function of at least one of a linear movement of the grating element, a rotational movement of the grating element, and a position of the grating element, and wherein the light pickup unit detects the superposition signal to determine at least one of the linear movement and rotational movement of the grating element;

wherein the grating element is oriented radially and configured to detect a rotational movement around a rotational axis, and wherein the fiber-optic light conductor unit includes a further beam splitter and two branch conductor lines extending downstream from the further beam splitter such that a first pair of two partial beams are guided by a first branch conductor line to a first portion of the grating element on one side of the rotational axis and a second pair of two partial beams are guided by a second branch conductor line to a second portion of the grating element on a second side of the rotational axis.

* * * * *